Figure 1:
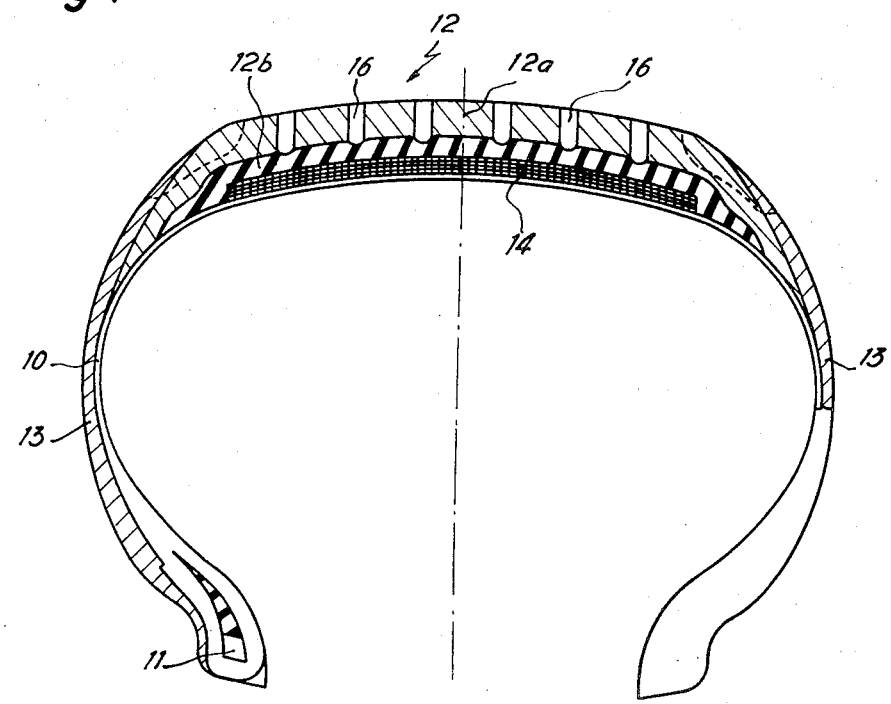

United States Patent [19]
Greiner et al.

[11] 3,759,306
[45] Sept. 18, 1973

[54] TIRE HAVING REINFORCING WITH HIGH MODULES OF ELASTICITY

[75] Inventors: Henri Greiner, Conflans Sainte Honorine; Yves Masson, Paris; Jean Olagnier, Levallois-Perret, all of France

[73] Assignee: Pneumatiques, Caoutchouc Manufacture Et Plastiques, Kleber-Colombes, Colombes, France

[22] Filed: Oct. 26, 1971

[21] Appl. No.: 192,201

[30] Foreign Application Priority Data
Oct. 27, 1970 France .............................. 7038760

[52] U.S. Cl. .......... 152/374, 152/361 R, 152/DIG. 4
[51] Int. Cl. ......................... B60c 1/00, B60c 19/00
[58] Field of Search .............. 152/361, 374, DIG. 4, 152/209 R, 354, 357; 156/128 T, 128 R

[56] References Cited
UNITED STATES PATENTS
2,108,973 2/1938 Parkinson ..................... 152/DIG. 4
1,719,628 7/1929 Sloman .......................... 152/209 R
3,192,984 7/1965 Bourdon ........................... 152/354
2,198,483 4/1940 Marick .......................... 152/DIG. 4

*Primary Examiner*—Gerald M. Forlenza
*Assistant Examiner*—George H. Libman
*Attorney*—Joseph F. Brisebois et al.

[57] ABSTRACT

A tire suitable for use with a fast vehicle, a vehicle carring a heavy load, or a vehicle exerting a high torque having a tread, an outer portion of the tread being sculptured and having hollows, a carcass and a reinforcing member having an outer face spaced radially from the level of the bottoms of the hollows of the sculptured portion, whrein there is a second portion of the tread between the level of the bottom of the sculptured portion and the outer face of the reinforcing member which second portion is made of a rubbery mixture having a high modulus of elasticity at least equal to 40 kg/cm$^2$ at 100 percent elongation, whilst the sculptured outer portion of the tread is made of a rubbery mixture having a less high modulus of elasticity.

This tire displays high resistance to any tendency of the sculptured portion to be worn away or stripped off whilst retaining its other essential qualities.

6 Claims, 5 Drawing Figures

TIRE HAVING REINFORCING WITH HIGH MODULES OF ELASTICITY

The invention relates to tires which are subjected to severe conditions of use, for example the tires for sports cars or long-distance touring cars (G.T. cars) capable of travelling at speeds of the order of 200 km/h, the tires for aeroplanes capable of travelling on the ground at speeds as high as 500 km/h, as well as the tires for lorries and other heavy appliances and agricultural tractors.

When these tires are operated at high speeds or when they are subjected to loads or torques which are large, certain sculptured portions of the tread are sometimes torn away. It has been observed that the tearing away often begins at the bottom of the hollows of the sculpture and spreads horizontally into the base of the reliefs constituted by the ribs and the pavings or the blocks of the sculpture. At these points the rubbery mixture of the tread is subjected to alternate stresses of compression and of extension upon entering and leaving the zone of contact of the tire with the ground, as well as stresses of longitudinal and transverse shear resulting from the driving torque and from the lateral stresses when cornering. The relative mobility of the projecting portions of the sculpture in relation to the subjacent solid portion of the tread called the "sub-sculpture" is without doubt the cause of these parts being torn away, but this sculpture is nevertheless absolutely essential to give the tire sufficient adherence on different types of ground. In addition, this sculpture has to be deep enough to preserve this adherence over a long distance and it can be seen that, by increasing the depth of the sculpture to this end, the mobility of the projecting portions is also increased together with the risk of the parts being torn away under severe conditions of speed, load and torque.

Various attempts have been made to resolve this problem. Attempts have for example been made to improve the quality of the rubbery tread mixtures by the use of ingredients which, while having an equal modulus of elasticity, confer on these mixtures a better resistance to tearing, but the gain obtained in this way does not appear to be very great. Reinforcing fabric layers placed in the heart of the tread have also been used with success in aeroplane tires. These fabric layers, by increasing the resistance to centrifugal deformation of the tread, effectively reduce the tearing away of the sculpture at high speed. However, this means is not easy to use in other types of tires because of the more distorted shape of the sculpture, the lower thickness of the sub-sculpture and also because of the comparatively high cost of this construction.

Proposals have also been made, but with somewhat different aims in mind, to use, in the tread, rubbery mixtures containing dispersed short fibres, generally metal fibres. It has thus been proposed to make the whole of the tread in such a fibrous mixture in order to increase the adherence to slippery ground, but this has proved to be somewhat illusive. Furthermore, the adherence to dry ground and the resistance to wear are diminished. In other cases a layer of fibrous mixture has been placed at the centre of or inside the tread in order to form a protective barrier against perforations and cuts of the carcass by pebbles. These constructions are not sufficiently effective against the tearing away of the sculpture and it has, on the contrary, been observed that the resistance to tearing away was often decreased because of the heterogeneity of these fibrous mixtures. In fact, despite the treatment to which the fibres are subjected to render them adhesive, their bond with the rubber is not always satisfactory and it has a tendency to deteriorate with ageing and with the stresses in service, giving rise to the appearance of the beginnings of many tears. For the same reason, these fibrous mixtures are not very suitable for the retreading of worn tires.

By means of the invention, the resistance to tearing of the sculptured outer portion of the treads of tires suitable for fast vehicles and/or vehicles carrying heavy loads and of tyres subjected to forces due to high torque is considerably increased, without, for all that, decreasing the other essential qualities, by making the internal portion of the tread between the level of the hollows of the sculpture or slightly above this level and the upper face of a reinforcing member of the tread of a rubbery mixture having a high modulus of elasticity equal to or greater than 40 kg/cm2 at 100 percent elongation, whilst the sculptured outer portion of the tread is made of a rubbery mixture having a lesser modulus of elasticity.

By way of illustration, the customary rubber mixtures for treads have a modulus of elasticity of the order of 20 to 25 kg/cm2 at 100 percent elongation according to the types of tires. This value of the modulus and composition of these mixtures are chosen so that the mixtures are easy to work and so that they have the optimum properties for behaviour on the road, in particular resistance to wear and adherence to the ground. However, by using, in accordance with the invention, mixtures having a very high modulus of elasticity only for the internal parts of the tread between the reinforcing member of the tread and the level of the hollows of the sculpture, the resistance of the sculptured portions to being torn away is reinforced while their relative mobility is decreased by a more rigid anchorage of their base. At the same time, the stresses which were previously developed at the bottom of the hollows of the sculpture are either better endured by the mixture having a high modulus at these points, or else are displaced from these critical points.

Figure 2:
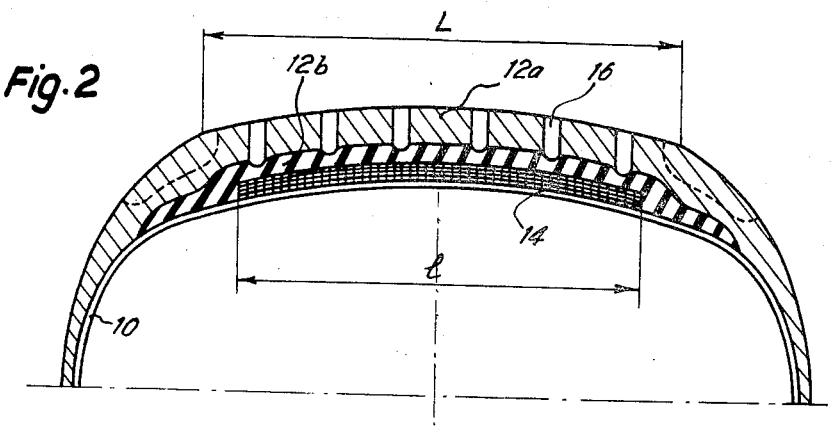
Figure 3:
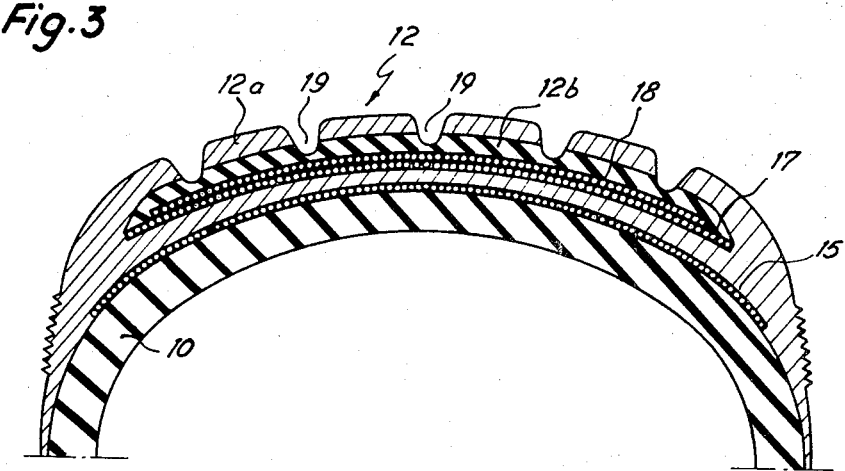
Figure 4:
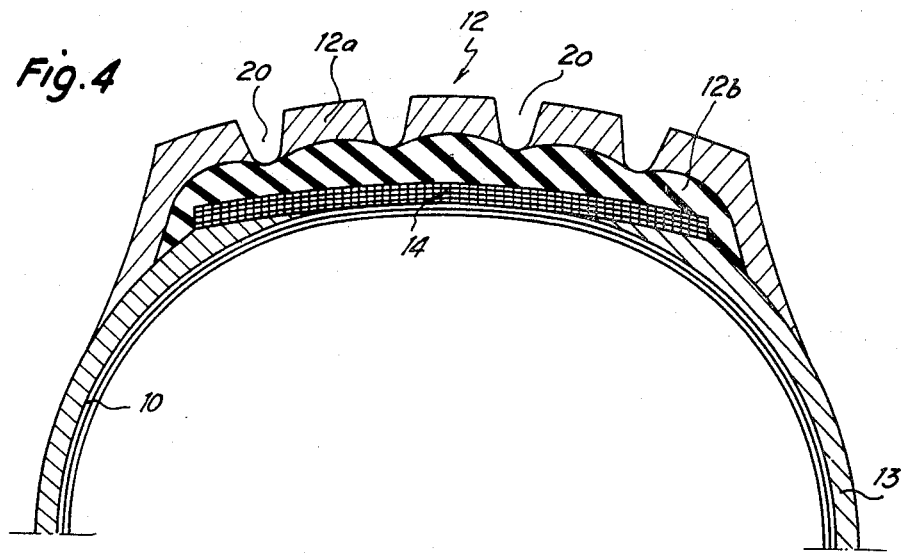
Figure 5:
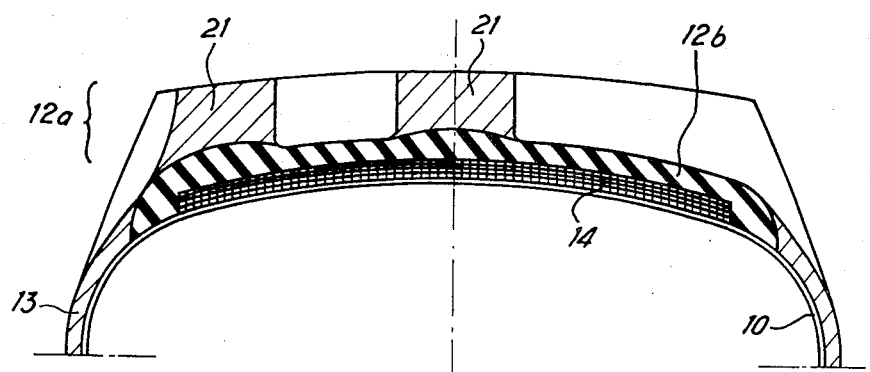

Embodiments of the invention will now be described by way of example with reference to the attached drawings, in which:

FIGS. 1 and 2 are cross-sectional views of a tire for fast touring or sports vehicles, FIGS. 3, 4 and 5 are cross-sectional views of the upper halves of a tire for an aeroplane, of a tire for a lorry and of a tire for a tractor.

The tires illustrated in these drawings comprise a carcass 10 whose edges are turned around metal bead wires 11, a tread 12 and side walls 13. The carcass 10 can be of the radial ply type or of the cross ply type. In the first case (FIG. 1, 2 and 4) it consists of one or more sheets of "cord" fabric each composed of twisted cords directed in accordance with the meridian planes of the tire. The carcass supports at its summit a reinforcing member constituted by a belt 14 formed, for example, from one or more pairs of sheets of "cord" fabric of the same width, the twists forming the sheets of each pair being symmetrically arranged at a low angle in relation to the equatorial plane of the tire in order to form a non-extensible whole opposing the radial expansion of the carcass 10 under the influence of the tire inflating pressure. Other known belt constructions can be used. In the second case (FIG. 3) the carcass 10 has pairs of sheets of fabric in which the twisted cords are directed on the slant in relation to the equatorial or meridian plane of the tire and the summit of this carcass is surmounted by a protection member 15 constituted by a sheet in which the twists have substantially the same orientation as those of the carcass. The invention can be applied also to an intermediate type of tire having a cross ply carcass and a non-extensible belt such as 14.

In the case of FIGS. 1 and 2, the tread 12 can be subdivided into two portions, namely an outer portion 12a having an anti-skid sculpture appropriate to the use of the tire and whose thickness corresponds, at least over the width of the tread, to the depth of the hollows 16 of the sculpture and an internal portion 12b between the upper face of the carcass 10 and of the belt 14 and the level of the bottom of the hollows 16 of the sculpture. The sculptured outer portion 12a is made of a customary rubbery mixture having a high resistance to wear and having good adherence to the ground; this mixture has a modulus of elasticity of the order of 20 kg/cm$^2$ at 100 percent elongation. On the other hand, the inner portion 12b, or sub-sculpture, is made of a rubbery mixture having a high modulus of elasticity equal to or greater than 40 kg/cm$^2$.

In order to obtain a tire with the tread described above, one can, at the time of making-up the tire, place successively on the summit of the carcass of the crude tire provided with its belt 14, a band or strip 12b made of a rubbery mixture and having a thickness of 4 to 5 mm approximately, or according to the dimensions of the tire, and then a profiled band 12a made of a rubbery mixture. In the course of the subsequent moulding of the tire, the reliefs of the mould, corresponding to the rolling surface having a width "L" (FIG. 2), traverse practically the entire thickness of the tread 12a in order to reach the tread band 12b in which they can be slightly imprinted. The vulcanisation ensures an intimate bond of the portions 12a and 12b one to another and with the carcass and the belt of the tire. The extension of the portion 12b as far as the level of the bottom of the hollows of the sculpture and even preferably slightly beyond this level, that is to say to 1 or 2 mm above, gives to the projecting portions of the sculpture a far better resistance to tearing or stripping at high speed by virtue of the fact that the mixture having a high modulus of elasticity constitutes the bottom of the hollows 16 and the seating for the base of the projecting portions between the hollows 16. Naturally, the inner portion 12b has to have a sufficient thickness to ensure a good seating and a good anchoring for the sculptured portion. The thickness of the portion 12b is, for example, equal to at least a quarter of the thickness of the sculptured portion 12a.

In the case of tires having a belt such as those of FIGS. 1 and 2, the internal portion 12b having a high modulus has furthermore the effect of making more rigid the summit of the tire and of exerting consequently an effect which is complementary to that of the belt 14 itself. This complementary effect can be turned to account either to increase the directional stabilisation effect proper to the belt or to reduce the structural size of the belt itself, for example by using a lesser number of sheets than would be necessary without the portion 12b having a high modulus, or by reducing the width "1" of this belt to a value distinctly less than the width "L" of the rolling surface as shown by FIG. 2. This allows the cost of the tire to be reduced by using less fabric for an equivalent result from the point of view of road-holding.

FIG. 3 shows the upper half of the section of an aeroplane tire in which the tread 12 comprises a reinforcing member constituted by reinforcing fabric covers 17–18 embedded in the centre of the thickness of the internal portion of the tread and whose function is to avoid the tearing or stripping of the whole of the tread in relation to the carcass under the action of centrifugal force at a very high speed. These reinforcing fabric covers 17–18 therefore situated at some distance from the bottom of the circumferential grooves 19 of the customary sculpture of this type of tires. A layer 12b made of a rubbery mixture having a very high modulus of elasticity is placed over the upper canvas cover 18 and it extends to a level slightly above the bottom of the grooves 19. The outer portion 12a of the tread substantially constituting the ribs between the grooves 19 is made of a known rubbery mixture having high resistance to wear. Here again the sub-sculpture 12b having a high modulus increases the resistance to tearing or stripping of the ribs at high speed at the same time as it increases the proper effect of the reinforcing canvas covers 17–18 referred to above. Furthermore, this layer 12b having a high modulus reduces the risk of the canvas cover 18 coming flush with the bottom of the groove 19 in the course of moulding and it thus co-operates in maintaining the canvas covers in a good position during the vulcanisation. These canvas covers 17–18 can also be coated by calendering with the same rubbery mixture as that of the portion 12b or with a similar mixture from the point of view of the modulus of elasticity.

FIG. 4 illustrates the application of the invention to tires for heavy-weight vehicles where the problem of the tearing or stripping of the ribs is also posed more especially when these tires are called upon to carry heavy loads over long distances. The tire shown is of the type having a radial carcass 10 and having a summit belt 14. The tread 12 has a sculpture having grooves 20 and it is constituted by an internal portion 12b made of a mixture having a high modulus of elasticity extending from the upper face of the belt as far as the level of the bottoms of the grooves and by an outer portion 12a made of a known mixture resistant to wear.

FIG. 5 shows an application of the invention to a tire for the driving wheel of an agricultural tractor. These tires are required to sustain high driving torques which sometimes bring about the tearing or stripping of the small bars 21 having high relief which constitute the sculptured portion 12a of the tread. The tire shown is again of the tire having a radial carcass 10 and having a reinforcing belt member 14 placed directly on the summit of the carcass. The sub-sculpture portion 12b between the belt member 14 and the level of the base of the small bars 21 is made from a mixture having a high modulus so as to anchor the base of the small bars solidly. These latter are thus better able to resist the stresses causing tearing or stripping. They are furthermore made less mobile and, on that account, they wear away more evenly.

In the examples which have just been described, the inner portion 12b having a high modulus has a thickness which is substantially uniform from one edge to the other. It must be understood, however, that this thickness could vary, the inner portion 12b being made, for example, either thicker at the centre or thicker at its lateral edges according to the shape of the sculpture and the depth of the hollows of the sculpture of the tire in question. In view of the diversity of the shapes of the sculptures for the specific uses of the various tires, it is possible that, in certain cases, the risks of tearing or stripping the projecting portions concern principally either the centre or the lateral sides of the sculptured portion. In certain special cases, it will be possible for the portion 12b to be located principally in the regions of the sculptured zones which are the most exposed to being torn away or stripped either on the sides, or at the centre.

As has been indicated above, the rubbery mixture used to form the sub-sculpture portion 12b of the tread has to have, in the vulcanised state, a modulus of elasticity equal to or greater than 40 kg/cm² at 100 percent elongation and preferably between 50 and 150 kg/cm². Such mixtures having a high modulus can be obtained by incorporating reinforcing materials in high proportions or short textile or metal fibres. However, in the case of the fibrous mixtures it has been found that, contrary to the current practice using comparatively large fibres having a diameter of the order of 0.1 mm and lengths of at least 1 cm, it is essential to use fibres which are much finer having a diameter not greater than 0.03 mm. These very fine fibres allow one to have rubbery mixtures which are easier to work in the crude state, and are much more homogeneous and in which the fibres constitute a very tenuous reinforcing structure. Very fine glass fibres are well suited for use in these mixtures.

In accordance with another feature of the invention, rubbery mixtures can be used which are charged at one and the same time with carbon black and with a fine powder of a polyolefin, such as polyethylene, having a very high molecular mass, that is to say an average molecular mass equal to or greater than about 500,000. These mixtures can be worked very easily in the crude state and they allow one to obtain, after vulcanisation, very high moduli of elasticity.

The Table below indicates four examples of suitable mixtures.

|   | A | B | C | D |
|---|---|---|---|---|
| Smoked leaf or SBR 1500 | 100 | 100 | 100 | 100 |
| Reinforcing black | 70 | 70 | 70 | 50 |
| Polyethylene |  |  | 100 | 100 |
| Cut glass fibres |  |  |  | 10 |
| Zinc oxide | 5 | 5 | 5 | 5 |
| Stearic acid | 2 | 2 | 2 | 2 |
| Aromatic oil | 5 | 5 | 40 | 5 |
| Antioxygen | 2 | 2 | 2 | 2 |
| Accelerator MOR | 2.5 | 2.5 | 1.5 | 1 |
| Sulphur | 4 | 4 | 2 | 1.5 |
| Shore hardness A | 78 | 94 | 90 | 76 |
| Moduli of elasticity 100% (lkg/cm²) | 96 | 142 | 90 | 50 |
| Resistance to rupture | 155 | 193 | 226 | 230 |
| Elongation at rupture % | 150 | 200 | 550 | 400 |

We claim:

1. A tire for a high speed and/or heavy duty vehicle comprising a carcass, a bead in each edge of the carcass, a reinforcing tread member in the crown region of the tire, and a tear resistant tread comprising an antiskid outer tread portion made of wear resistant rubber compound having a relatively low modulus of elasticity in the range of 20 to 25 kg/cm² at 100 percent elongation, hollows extending from the outer tread surface into the tread, and an inner tread portion only in the area of the tread extending from the reinforcing tread member to the level of the bottom of the outer tread hollows, said inner portion being made of a rubber compound having a substantially higher modulus of elasticity at least equal to 40 kg/cm² at 100 percent elongation.

2. A tire according to claim 1 in which the second portion of the tread has a thickness equal to a least a quarter of the thickness of the sculptured outer portion of the tread.

3. A tire according to claim 1 having a carcass in which the reinforcing member is a relatively non-extensible belt placed on the carcass.

4. A tire according to claim 1 in which the second portion is made of a rubbery mixture containing a high content of reinforcing material.

5. A tire according to claim 4 in which the reinforcing material comprises fibres having a diameter less than 0.03 mm.

6. A tire according to claim 1 in which the rubbery mixture of the second portion includes reinforcing material which includes a finely divided polyolefin having a molecular mass of at least 500,000.

* * * * *